US007969381B2

(12) United States Patent
Kanazawa et al.

(10) Patent No.: US 7,969,381 B2
(45) Date of Patent: Jun. 28, 2011

(54) PATCH ANTENNA

(75) Inventors: Masaru Kanazawa, Kawasaki (JP); Tabito Tonooka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 11/902,834

(22) Filed: Sep. 26, 2007

(65) Prior Publication Data

US 2008/0150812 A1 Jun. 26, 2008

(30) Foreign Application Priority Data

Dec. 25, 2006 (JP) ................................ 2006-347355

(51) Int. Cl.

*H01Q 3/24* (2006.01)
*H01Q 1/24* (2006.01)
*H01Q 1/38* (2006.01)
*H04M 1/00* (2006.01)

(52) U.S. Cl. ................ 343/876; 343/702; 343/700 MS; 455/575.3

(58) Field of Classification Search .................. 343/702, 343/700 MS, 876, 756; 455/575.1, 575.3, 455/575.7, 90.3

See application file for complete search history.

(56) References Cited

U.S. PATENT DOCUMENTS 7,212,164 B2 * 5/2007 Miyano et al. ................ 343/702
7,405,697 B2 * 7/2008 Ying ...................... 343/700 MS
2004/0227673 A1 * 11/2004 Iwai et al. .................... 343/702
2006/0290582 A1 * 12/2006 Lee .............................. 343/745
2007/0035463 A1 * 2/2007 Hirabayashi .................. 343/824
2008/0018542 A1 * 1/2008 Yamazaki et al. ............ 343/702

FOREIGN PATENT DOCUMENTS

JP 01-179613 A 12/1989
JP 5-167335 A 7/1993
JP 11-186947 A 7/1999
JP 2000-004119 A 1/2000
JP 2000236209 * 8/2000
JP 2001-274616 A 10/2001
JP 2001-332929 A 11/2001
JP 2003-347832 A 12/2003
JP 2005-130216 A 5/2005
JP 2006-340234 A 12/2006
WO WO2005104299 A1 * 3/2005

OTHER PUBLICATIONS

Japanese Office Action dated Jan. 25, 2011, issued in corresponding Japanese Application No. 2006-347355.

* cited by examiner

*Primary Examiner* — Jacob Y Choi
*Assistant Examiner* — Robert Karacsony
(74) *Attorney, Agent, or Firm* — Westerman, Hattori, Daniels & Adrian, LLP

(57) ABSTRACT

A wireless device has a housing, a patch antenna, and an open/shut sensing unit which senses the open/shut state of the housing and forms an open/shut signal indicating the open/shut state. The patch antenna has a first element which corresponds to a first polarized wave, a second element which corresponds to a second polarized wave and is to be added to the first element, and a switching unit. The switching unit disconnects and connects the second element from and to the first element based on the open/shut signal to make the patch antenna suitable for the first or second polarized wave.

7 Claims, 6 Drawing Sheets

FIG. 9A

81

| AXIS | | Y-AXIS (PITCH) | |
|---|---|---|---|
| | | 0 TO 179° | 180 TO 359° |
| Z-AXIS (YAW) | 0 TO 89° | F | R |
| | 90 TO 179° | R | F |
| | 180 TO 269° | R | F |
| | 270 TO 359° | F | R |

FIG. 9B

82

| AXIS | | Y-AXIS (PITCH) | |
|---|---|---|---|
| | | 0 TO 179° | 180 TO 359° |
| Z-AXIS (YAW) | 0 TO 89° | H | L |
| | 90 TO 179° | L | H |
| | 180 TO 269° | L | H |
| | 270 TO 359° | H | L |

FIG. 9C

| | |
|---|---|
| OPEN | H |
| CLOSED | L |

PATCH ANTENNA

CROSS-REFERENCE TO RELATED APPLICATIONS

This application claims the conventional priority based on Japanese Patent Application No. 2006-347355, filed on Dec. 25, 2006, the disclosures of which are incorporated herein by reference.

BACKGROUND OF THE INVENTION

1. Field of the Invention

The present invention relates to a patch antenna and a wireless device, and more particularly to a patch antenna which has degenerate separation elements thereof and switches between the degenerate separation elements according to a polarized wave, and a wireless device which has the above patch antenna.

2. Description of the Related Art

In these years, cell phones (or mobile phone) have been increasing in functional versatility, and have been equipped with various applications using radio. An example of such cell phones is a cell phone having the function of identifying its location using the GPS (Global Positioning System). This cell phone has a circularly polarized wave patch antenna for reception of GPS radio waves (a circularly polarized wave patch antenna for the GPS) to receive a radio wave from a GPS satellite.

It is desirable for a circularly polarized wave patch antenna to efficiently receive a circularly polarized wave regardless of whether it is left-hand circular polarization (LHCP) or right-hand circular polarization (RHCP). For this purpose, a patch antenna is proposed which is arranged on six faces of a cube-shaped solid, thereby, without switching of a receivable polarized wave, preventing the presence of a plane on which a receivable polarized wave switches from one to another (see Japanese Patent Laid-Open No. 2001-332929). A patch antenna is also proposed which is allowed to easily deal with left-hand circular polarization and right-hand circular polarization by providing a dielectric for adjustment on a feeding patch (see Japanese Patent Laid-Open No. 2003-347832). Further, various shapes are proposed as candidates for the shape of a patch element (see Japanese Patent Laid-Open No. 5-167335).

In a cell phone, a circularly polarized wave patch antenna is optimized only for one of open and shut (or closed) states of a housing, and is not optimized for the other. That is, the cell phone cannot control a circularly polarized wave according to the open/shut state of the housing. Accordingly, the cell phone suffers a large loss and inefficiency for receiving weak radio waves.

Since a radio wave from a GPS satellite is RHCP, for example, assume that a flip cell phone is designed to efficiently receive such a polarized wave in an open state (a state in which a movable unit having a liquid crystal display is opened). In this case, a polarization direction as viewed from an antenna is a direction of right-hand rotation. That is, this circularly polarized wave patch antenna for the GPS is an antenna for RHCP reception. On the other hand, in a shut state (a state in which the movable unit is shut or closed), a radio wave from the GPS satellite is received from on the reverse side of the antenna. In this case, the polarization direction as viewed from the antenna is a direction of left-hand rotation, and the reception is equal to reception of a LHCP radio wave by the antenna for RHCP reception. That is, cross polarization occurs, and the antenna characteristics appear to be deteriorated.

Under the circumstances, there is a need for an antenna capable of switching a polarized wave to be received according to the open/shut state of a housing of a cell phone, regardless of the open/shut state of the housing. However, a patch antenna to be mounted in a small terminal such as a cell phone needs to be small. For example, it is very difficult to mount a cube-shaped patch antenna described in Japanese Patent Laid-Open No. 2001-332929 in a terminal such as a cell phone.

SUMMARY OF THE INVENTION

It is an object of the present invention to provide a patch antenna which can satisfactorily receive both left-hand circular polarization and right-hand circular polarization regardless of the open/shut state of a housing of a terminal.

It is an another object of the present invention to provide a wireless device having a patch antenna which can satisfactorily receive both left-hand circular polarization and right-hand circular polarization regardless of the open/shut state of a housing of a terminal.

A patch antenna of the present invention comprises a first element which corresponds to a first polarized wave, a second element which corresponds to a second polarized wave and is to be added to the first element, and a switching unit which disconnects the second element from the first element or connects the second element to the first element to make the patch antenna suitable for the first or second polarized wave.

Preferably, in one aspect of the present invention, the first element comprises a conductor layer which has an outer shape of a circular shape or a regular polygonal shape and has two recessed regions formed by notching the outer shape in a rectangular shape at two predetermined opposite positions. The second element comprises two conductor layers provided at positions corresponding to the two recessed regions. The switching unit comprises two switching elements which connect the first element and the second element and are provided in the two recessed regions.

A wireless device of the present invention comprises a patch antenna, a housing having the patch antenna, and an open/shut sensing unit which senses an open/shut state of the housing and forms an open/shut signal indicating the open/shut state. The patch antenna comprises a first element which corresponds to a first polarized wave, a second element which corresponds to a second polarized wave and is to be added to the first element, and a switching unit which disconnects the second element from the first element or connects the second element to the first element to make the patch antenna suitable for the first or second polarized wave. The switching unit switches the disconnection of the second element from the first element and the connection of the second element to the first element based on the open/shut signal.

Preferably, in one aspect of the present invention, the wireless device comprise a cell phone which has a first housing and a second housing, both of which are provided to be openable and closable, and the patch antenna is provided in the first or second housings.

Preferably, in one aspect of the present invention, the wireless device further comprises an attitude sensing unit which senses a tilt of the housing and forms an attitude signal indicating the tilt, and a control unit which forms a control signal for the switching unit based on the open/shut signal and the attitude signal. The switching unit switches the disconnection of the second element from the first element and the connection of the second element to the first element based on the control signal.

According to the patch antenna of the present invention, the second element which corresponds to the second polarized wave is disconnected from or connected to the first element which corresponds to the first polarized wave. This makes it possible to bring the patch antenna in a state suitable for the first polarized wave or a state suitable for the second polarized wave.

Since a radio wave from a GPS satellite is RHCP (the first polarized wave), for example, in a flip cell phone, an antenna comprises the first element which corresponds to RHCP to efficiently receive such a polarized wave in an open state (a state in which a movable unit having a liquid crystal display is opened). However, in a shut state (a state in which the movable unit is shut or closed), the antenna receives a radio wave from the GPS satellite on the reverse side. This is equal to reception of a LHCP radio wave (the second polarized wave) by the antenna for RHCP reception. Then, this state causes cross polarization and causes the antenna characteristics to appear to be deteriorated. Under the circumstances, in the present invention, the second element which corresponds to the second polarized wave is connected to the first element, and an antenna comprises the second element which corresponds to LHCP.

As described above, according to the present invention, the patch antenna can be brought into the state suitable for the first polarized wave or the state suitable for the second polarized wave, as needed. This makes it possible in a wireless device such as a cell phone to control a patch antenna to be optimized for reception of circularly polarized waves according to the open/shut state of a housing of the wireless device, and to reliably receive weak radio waves with a small loss. It is also possible to obtain a patch antenna (planar antenna) which can be mounted on a small wireless device such as a cell phone.

According to one aspect of the present invention, the first element which comprises a patch element and a first degenerate separation element is formed by recessing (or notching) the conductor layer in a rectangular shape, which has a circular shape or regular polygonal shape and using as the first element. The second element is formed which comprises a second degenerate separation element. The switching elements are provided in the recessed regions. This makes it possible to construct the patch antenna, which can be brought into the state suitable for the first or second polarized wave.

According to the wireless device of the present invention, the second element which corresponds to the second polarized wave is disconnected from or connected to the first element which corresponds to the first polarized wave, on the basis of the open/shut signal indicating the open/shut state of the housing. This makes it possible to bring the patch antenna into the state suitable for the first or second polarized wave.

According to one aspect of the present invention, in the cell phone having the first and second housings, which are provided to be openable and closable, the patch antenna is provided in the first or second housing. This makes it possible to bring the patch antenna into the state suitable for the first or second polarized wave, based on whether the housings of the cell phone are opened or closed (or shut).

According to one aspect of the present invention, the switching unit switches the disconnection and connection of the second element from and to the first element, based on the attitude signal indicating the tilt of the housing and the open/shut signal. This makes it possible to bring the patch antenna into the state suitable for the first or second polarized wave, based on the state and the tilt of the housing.

BRIEF DESCRIPTION OF THE DRAWINGS

FIGS. 9A to 9C are tables for explaining the cell phone which is the example of the wireless device in FIG. 7.

DETAILED DESCRIPTION OF THE PREFERRED EMBODIMENTS

Figure 1:
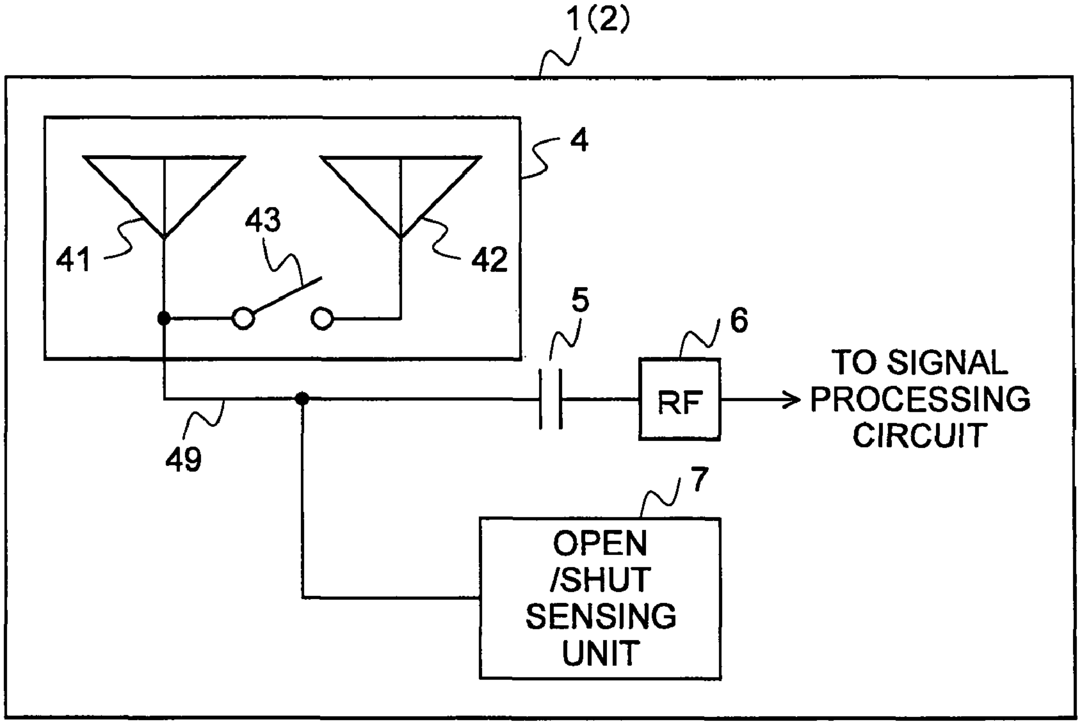
FIG. 1 is a block diagram showing an example of a patch antenna of the present invention and an example of a wireless device.
Figure 2:
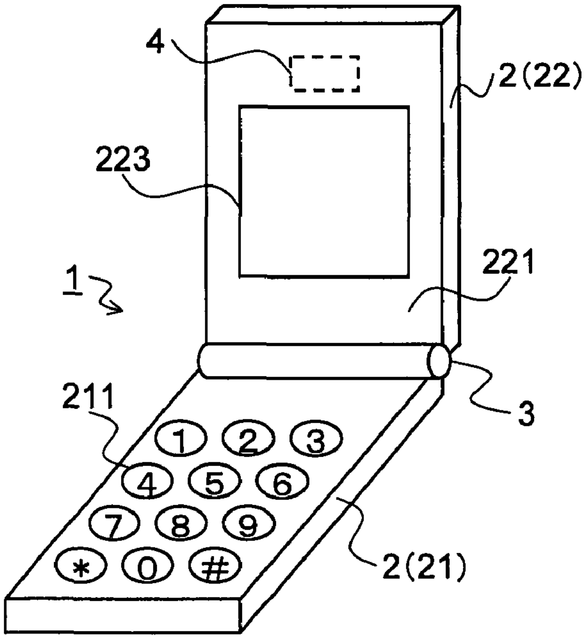
FIGS. 2, 3A, and 3B are views showing a cell phone which is an example of the wireless device having the patch antenna in FIG. 1.
Figure 3A:
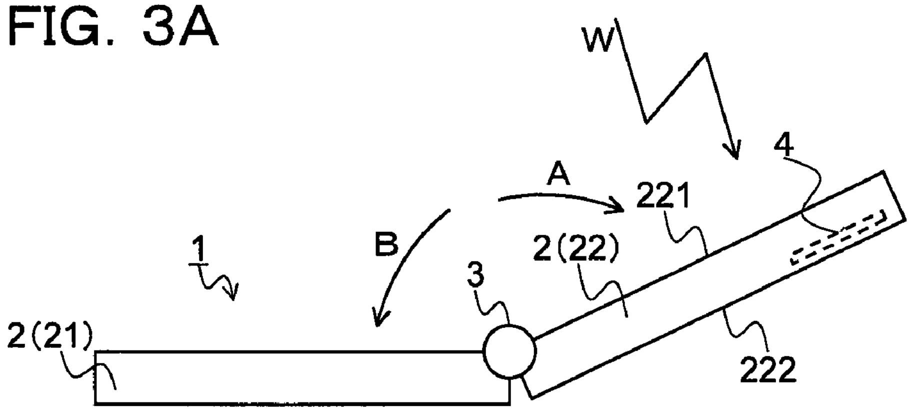
Figure 3B:
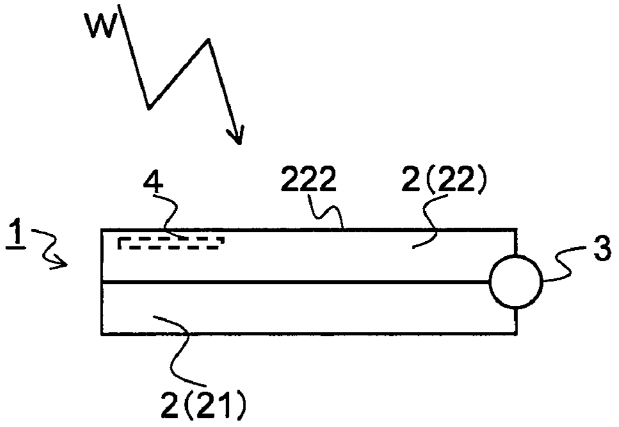

FIG. 1 is a block diagram showing an example of a wireless device having a patch antenna of the present invention. FIGS. 2, 3A, and 3B are views showing a cell phone which is an example of the wireless device in FIG. 1.

A wireless device 1 according to an embodiment of the present invention has a housing 2, a rotation support unit 3, a patch antenna 4, a capacitor 5, a detection circuit for radio-frequency signal (RF) 6, and an open/shut sensing unit 7, as shown in FIGS. 1, 2, 3A and 3B. The capacitor 5 and detection circuit 6 constitute feeding unit to feed a power to the patch antenna 4.

The patch antenna 4 receives a radio wave W from a GPS satellite, for example. A radio signal received by the patch antenna 4 is supplied to the detection circuit 6 through a feeder line 49. The feeder line 49 connects between the capacitor 5 of the feeding unit and (a first element 41 of the patch antenna 4. The capacitor 5 removes (or cuts) DC component of the radio signal. The detection circuit 6 is a wave detection circuit, detects a radio wave received by the patch antenna 4, and outputs the detected signal to a signal processing circuit (not shown) at a subsequent stage.

The wireless device 1 comprises the flip cell phone 1, as shown in FIGS. 2, 3A, and 3B. That is, the housing 2 of the cell phone 1 is provided to be openable and closable (or foldable), and comprises a first housing 21 and a second housing 22. More specifically, the housing 2 comprises a fixed unit 21 which is the first housing, a movable unit 22 which is the second housing and movable relative to the fixed unit 21, and a rotation support unit 3 which is well-known and rotatably couples the fixed unit 21 and movable unit 22. The patch antenna 4 is housed in (or built in) the housing 2, and provided one of the first housing 21 and second housing 22.

The patch antenna 4 of this embodiment can be applied to a personal digital assistants (PDA) or the like, in addition to the cell phone 1. The patch antenna 4 of this embodiment can be applied not only to the flip cell phone 1 but also to a cell phone having single housing, or to a cell phone in which a movable unit can rotate by 180 degrees with respect to a fixed unit in a plane parallel with the fixed unit.

The patch antenna 4 has a first element 41 which corresponds to a first polarized wave, a second element 42 which corresponds to a second polarized wave and is to be added to the first element 41, and a switching unit 43, as shown in FIG. 1. The switching unit 43 brings the patch antenna 4 into a state suitable for the first or second polarized wave by disconnecting the second element 42 from the first element 41 or connecting the second element 42 to the first element 41.

The open/shut sensing unit 7 senses (or detects) the open/shut state of the housing 2, and forms an open/shut signal indicating the open/shut state. As is well known, the open/shut sensing unit 7 senses whether the cell phone 1 is in an open state or shut state, in conjunction with motion of the rotation support unit 3. A method for sensing the open/shut-state of the housing 2 by the open/shut sensing unit 7 is not limited to the above-described one. For example, some cell phones have several set options for an angle by which a housing is opened. In such a cell phone, it is determined in advance which angle of the cell phone is considered to be in the open state or shut state. Although not shown, the open/shut sensing unit 7 is provided on a print circuit board (to be described later) on which the patch antenna 4 is formed, for example.

The open/shut sensing unit 7 applies (or supplies) an open/shut signal to the switching unit 43 through the feeder line 49, which is originally used to connect the patch antenna 4 and the detection circuit 6. An open/shut signal is composed only of DC component, as will be described later. Thus, in this embodiment, the feeder line 49, which propagates a radio-frequency signal for the detection circuit 6, is also used to apply a DC signal. Since the capacitor 5 is inserted at a preceding stage of the detection circuit 6, it is possible to remove an open/shut signal composed of DC component, and to prevent the open/shut signal from affecting the detection circuit 6.

The switching unit 43 switches disconnection of the second element 42 from the first element 41 and connection of the second element 42 to the first element 41, based on the open/shut signal from the open/shut sensing unit 7. That is, it can also be described that the open/shut signal is a control signal for the switching unit 43, and the open/shut sensing unit 7 is a control unit for the switching unit 43.

For example, due to the disconnection of the second element 42 from the first element 41, the patch antenna 4 is composed of the first element 41, which corresponds to the first polarized wave. This brings the patch antenna 4 into a state suitable for receiving the first polarized wave. Due to the connection of the second element 42 to the first element 41, the patch antenna 4 is composed of the first element 41 and the second element 42, which corresponds to the second polarized wave. This brings the patch antenna 4 into a state suitable for receiving the second polarized wave.

Figure 4:
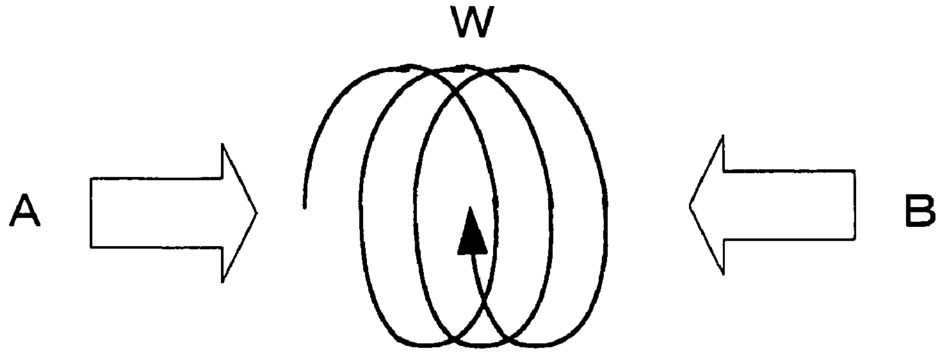
FIG. 4 is a view for explaining the rotation direction of a circularly polarized wave.

In this example, the first polarized wave is RHCP. For example, the radio wave W from a GPS satellite is RHCP. FIG. 4 is a view for explaining a circularly polarized wave. Each arrow in FIG. 4 indicates a polarization direction. In FIG. 4, a circularly polarized wave coming from a direction A is RHCP (right-hand rotation as viewed from the direction A). When receiving the radio wave W in the wireless device 1, it is preset to receive RHCP from the direction A at a surface of the patch antenna 4 (or a patch element 411, described later).

In this example, the second polarized wave is LHCP. In FIG. 4, a circularly polarized wave coming from a direction B is LHCP (left-hand rotation as viewed from B). For example, when the radio wave W from the GPS satellite is received on a back (or a back surface) of the patch antenna 4 in the wireless device 1, which is preset to receive RHCP on the surface of the patch antenna 4, the radio wave W looks like LHCP. As described above, the polarization direction of a circularly polarized wave changes from one direction to another direction opposite thereto, due to change of direction from which the circularly polarized wave is viewed, or change of the direction of an antenna which receives the circularly polarized.

The fixed unit 21 is a housing on which number buttons 211 are provided, as shown in FIG. 2. The movable unit 22 is a housing on which a liquid crystal display 223 is provided, as shown in FIG. 2. In this example, the patch antenna 4 is provided inside the movable unit 22, as indicated by dotted lines in FIGS. 2, 3A, and 3B.

FIGS. 2 and 3A show the open state of the cell phone 1, or a state in which the movable unit 22 having the liquid crystal display 223 is opened. For example, a user rotates the movable unit 22 about the rotation support unit 3 in a direction of the arrow A, while holding the fixed unit 21 by hand. With this operation, the user opens the cell phone 1, and performs communication. At this time, an inner surface 221 of the movable unit 22 faces upward (in a direction of a GPS satellite), and the cell phone 1 receives the radio wave W of the GPS on the surface of the patch antenna 4. The inner surface 221 of the movable unit 22 is a surface having the liquid crystal display 223.

As described above, the flip cell phone 1 is in the open state during a call. For this reason, the cell phone 1 is designed to efficiently receive a circularly polarized wave in the open state (during a call). That is, the patch antenna 4 is provided to receive the radio wave W of the GPS from a direction of the surface thereof, when the housing 2 is in the open state. In other words, the patch antenna 4 is provided to serve as an antenna for RHCP reception, when the housing 2 is in the open state.

FIG. 3B shows the shut state of the cell phone 1, or a state in which the movable unit 22 is closed (or shut). For example, a user rotates the movable unit 22 about the rotation support unit 3 in a direction of the arrow B in FIG. 3A, while holding the fixed unit 21 by hand. With this operation, the user closes (or folds) the cell phone 1, and brings it on a desk. At this time, an outer surface 222 of the movable unit 22 faces upward, and the patch antenna 4 receives the radio wave W of the GPS on the back thereof.

As described above, when the cell phone 1 is in the shut state, the patch antenna 4 receives the radio wave W from the GPS satellite on the back thereof. In other words, the patch antenna 4 is provided to serve as an antenna for LHCP reception, when the housing 2 is in the shut state.

Figure 5A:
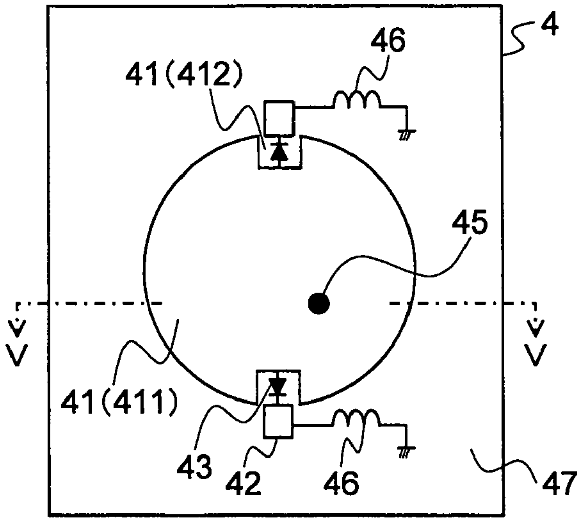
FIGS. 5A to 5C are plane views and FIGS. 6A and 6B are sectional views showing an example of the patch antenna of the present invention.
Figure 5B:
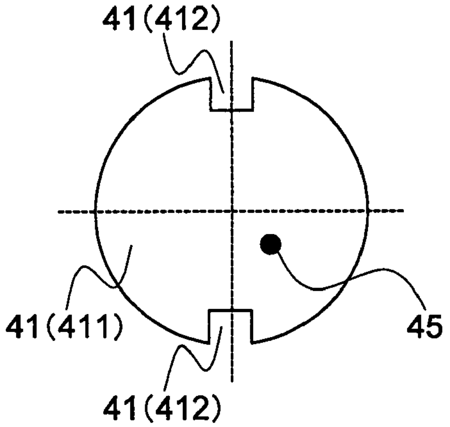
Figure 5C:
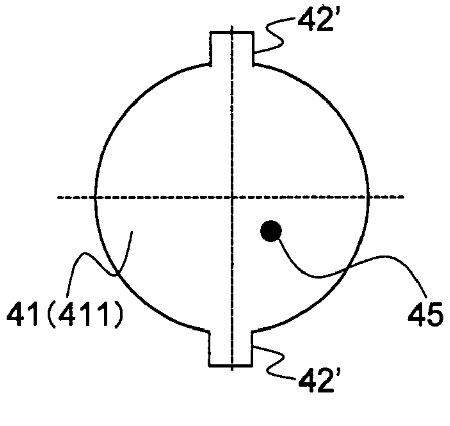

FIGS. 5A to 5C are views showing an example of the patch antenna 4 of this embodiment. FIG. 5A shows the planar structure of the patch antenna 4, and FIGS. 5B and 5C show the conceptual structure of the patch antenna 4.

The patch antenna 4 has the first element 41, the second element 42, the switching unit 43, choke coils 46, and a dielectric layer 47, as shown in FIG. 5A. The first element 41 and second element 42 constitute antenna elements. The first element 41 comprises the patch element 411 and first degenerate separation elements 412. Thus, the first element 41 is an antenna conductor which has the first degenerate separation elements 412. The second element 42 comprises the second degenerate separation elements 42. The switching unit 43 comprises the switching elements 43. The first element 41, second element 42, switching unit 43, and choke coils 46 are formed on the dielectric layer 47.

The patch element 411 of the first element 41 is connected to the feeder line 49 at a feeding point 45, as will be described later. The patch element 411 is connected to the second element or the second degenerate separation elements 42 through the switching elements 43. Each second degenerate separation element 42 is connected to a ground potential (or reference potential) through the corresponding choke coil 46.

The first element 41 of the patch antenna 4 comprises a conductor layer. The conductor layer has an outer shape of circular or regular polygonal shape, and has recessed regions formed by notching the outer shape in a rectangular shape at two predetermined opposite positions. That is, the patch element 411 is almost circular, as shown in FIG. 5A. As is well-known, the patch element 411 is notched (or recessed) in an almost rectangular shape at two positions symmetric about a point on the circumference of the patch element 411 to form the two recessed regions 412. Each recessed region 412 is a first degenerate separation element of rectangular shape, and is a degenerate separation element for RHCP, for example.

The shape of the patch element 411 is not limited to a circle, and may be a regular polygon (for example, a regular octagon) as well-known. In this case, the recessed regions 412 are formed by notching the regular polygon in a rectangular shape at the centers of two opposite sides of the regular polygon.

The second element 42 comprises two conductor layers which are provided at positions corresponding to the two recessed regions 412 and have shapes similar to those of the recessed regions 412. That is, the second degenerate separation elements 42 are provided at two positions which is at the outside of the circumference of the patch element 411 and corresponds to the recessed regions 412. Each second degenerate separation element 42 is a projected rectangular shaped degenerate separation element, and constitutes a part of a degenerate separation element for LHCP. The second degenerate separation elements 42 have shapes of rectangular shape similar to those of the recessed regions 412.

The switching unit 43 comprises the two switching elements 43. Each of the two switching elements 43 connects the first element 41 and the two conductor layers which are the second element 42. That is, each second degenerate separation element 42 is connected to the patch element 411 through the corresponding switching element 43. As shown in FIG. 5A, each switching element 43 is provided in the region 412 recessed in a rectangular shape. The switching element 43 comprises a PIN diode 4 which is suitable for high-frequency switching. Each of the switching elements 43 connects the patch element 411 and the second degenerate separation element 42 in the radial direction of the circular patch element 411.

Each of the two switching elements 43 comprises the PIN diode 43 which has a cathode connected to the patch element 411 of the first element 41 and an anode connected to the second element (or the second degenerate separation element) 42. That is, the PIN diodes 43 are connected such that a direction from the first element 41 to the second element 42 is the forward direction. This is because a control signal for the switching unit 43 from the open/shut sensing unit 7 is applied to the switching unit 43 from a direction of the first element 41 through the feeder line 49, as will be described later. The PIN diodes 43 are provided along a line connecting the two opposite recessed regions 412.

The second element 42 is connected to each choke coil 46 at a position opposite to the position at which the element 42 is connected to the PIN diode 43, and connected to the ground potential through the choke coil 46. The choke coil 46 cuts AC signals, and conducts only DC signals. Accordingly, the second element 42 is not grounded for AC signals, and is grounded for DC signals. This makes it possible to constitute a closed circuit for an open/shut signal composed of DC component (or a control signal to be described later), without affecting reception of radio waves in the second element 42.

When the PIN diodes 43 are conducting and the first element 41 and second element 42 are connected, the apparent size of a diameter of the patch antenna 4 becomes longer by an amount of the projecting portions of the second element 42 at which the second element 42 is provided.

In this example, the feeding point 45 is provided in a lower right region of four equal regions, which are obtained by dividing the circular patch element 411 by two dotted lines passing through the center of the circle and intersecting at right angles, as shown in FIGS. 5B and 5C. Actually, according to the position of the feeding point 45, the relationship between the degenerate separation elements and polarized wave reception is changed. In other words, polarized wave received at the circular patch element 411 is changed depending on which degenerate separation elements are added to the element 411. However, since the position of the feeding point 45 is fixed, the relationship can be determined in advance.

Each switching element 43 is not limited to a diode. As the switching element 43, a switching element like a transistor such as a MOSFET may be used. In this case, it is necessary to use a MOSFET with an excellent high frequency response characteristic, depending on the frequency of a radio wave to be received (for example, a radio wave from the GPS satellite).

Figure 6A:
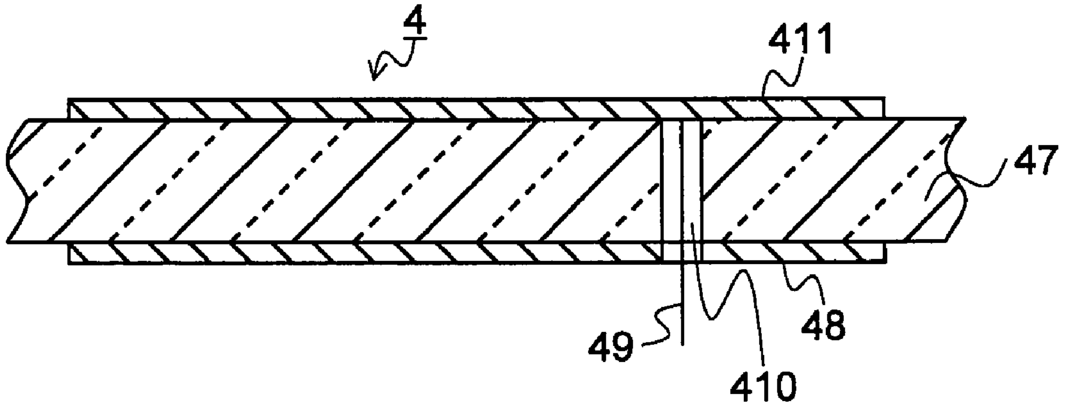
Figure 6B:
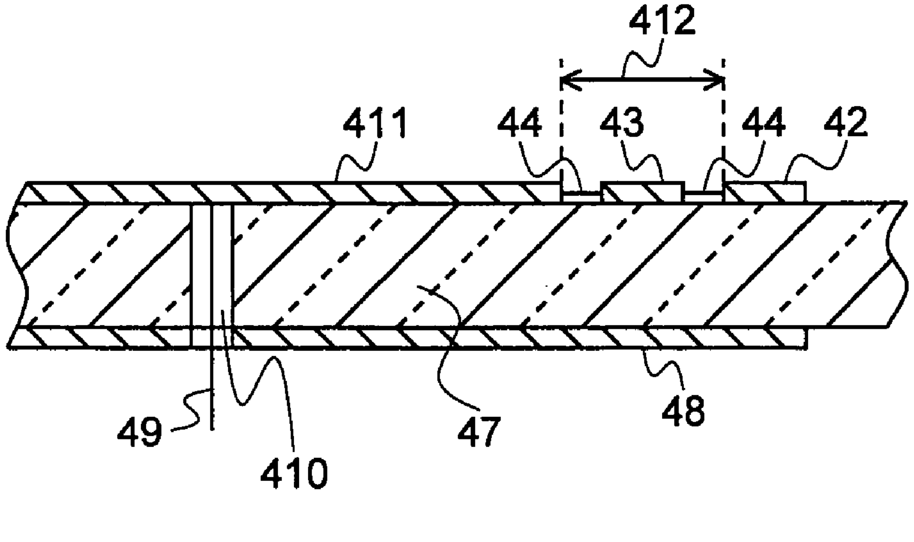

FIGS. 6A and 6B are configuration views showing the example of the patch antenna 4 according to the embodiment of the present invention. FIG. 6A shows the structure of a section of the patch antenna 4 taken along line V-V shown in FIG. 5A, and FIG. 6B shows the structure of a section of the patch antenna 4 in the vicinity of the switching unit 43.

The patch antenna 4 has the dielectric layer 47, the patch element 411 which comprises a conductor layer formed on a surface of the dielectric layer 47, and a ground conductor 48 which comprises a conductor layer formed on a back of the dielectric layer 47, as shown in FIG. 6A. The patch element 411 is connected to the feeder line 49. The feeder line 49 is connected to the antenna conductor 411 at the feeding point 45 through a connecting hole (or a contact hole) 410 formed in the dielectric layer 47. The ground conductor 48 is connected to the ground potential (not shown).

The dielectric layer 47 comprises a print circuit board, for example. Various other circuits such as the detection circuit 6 and open/shut sensing unit 7 are formed on the print circuit board. The switching element (PIN diode) 43 is provided in the recessed region 412 of the patch element 411, which is formed by notching the patch element 411 in a rectangular shape, as shown in FIG. 6B. Actually, the switching element 43 connects the patch element 411 and the second degenerate separation element 42 through wires 44.

The relationship between the patch antenna 4 of this embodiment and the open/shut state of the housing 2 of the cell phone 1 will be explained next.

First, a case will be explained in which (the housing 2 of) the cell phone 1 is in the open state. When the cell phone 1 is in the open state, the first housing 21 and second housing 22 are opened, as shown in FIG. 3A. In response to this, the open/shut sensing unit 7 senses the open/shut state of the first housing 21 and second housing 22, forms a low level signal (for example, 0V) as an open/shut signal according to the sensing result, and outputs the signal. The low level of the open/shut signal turns off the PIN diodes 43. As a result, the second element 42 is disconnected (or cut off) from the first element 41, and the patch antenna 4 is brought into a state suitable for the first polarized wave (RHCP).

That is, due to the low level of the open/shut signal, the PIN diodes 43 are not forward biased (or are reverse biased), and then the PIN diodes 43 are turned off. Accordingly, the second element 42 is disconnected from the first element 41. And, the patch antenna 4 is brought into a state in which the second degenerate separation elements 42 are disconnected. Thus, the patch antenna 4 is composed of the first element 41 which corresponds to the first polarized wave, or the patch element 411 to which the first degenerate separation elements 412 are added.

Thus, as described above, the patch element 411 is made to conceptually have a structure as shown in FIG. 5B. As a result, the patch antenna 4 is composed to serve as an antenna for RHCP reception.

Second, a case will be explained in which (the housing 2 of) the cell phone 1 is in the shut state. When the cell phone 1 is in the shut state, the first housing 21 and second housing 22 are closed (or shut), as shown in FIG. 3B. In response to this, the open/shut sensing unit 7 forms a high level signal (for example, 5V) as an open/shut signal, and outputs the signal. The high level of the open/shut signal turns on the PIN diodes 43. As a result, the second element 42 is connected to the first element 41, and the patch antenna 4 is brought into a state suitable for the second polarized wave (LHCP).

That is, due to the high level of the open/shut signal, the PIN diodes 43 are forward biased, and then the PIN diodes 43 are turned on. Accordingly, the second element 42 is connected (or short-circuited) to the first element 41. And, the patch antenna 4 is brought into a state in which the second degenerate separation elements 42 are connected. Thus, the patch antenna 4 becomes in a state suitable for the second polarized wave. As a result, the patch antenna 4 is composed of the first element 41 and the second element 42 which corresponds to the second polarized wave, or is composed of the patch element 411 and second degenerate separation elements 42.

In this case, a diameter of the patch antenna 4 is increased at one part, as shown in FIG. 5C. The diameter of the circular patch element 411 is important in reception of polarized waves. Accordingly, the patch antenna 4 serves as an antenna for LHCP reception, when the second degenerate separation elements 42 (42') are added.

Thus, as described above, the patch element 411 is made to conceptually have a structure having the second degenerate separation elements 42', as shown in FIG. 5C. As a result, the patch antenna 4 is composed to serve as an antenna for LHCP reception.

As described above, the first (rectangular shaped) degenerate separation elements (recessed regions) 412 are added to the patch element 411 when the housing 2 is in the open state, and the second (projected rectangular shaped) degenerate separation elements 42 are added to the patch element 411 when the housing 2 is in the shut state. As a result, the patch element 411 appears to be an antenna (antenna conductor) having recessed rectangular shaped degenerate separation elements when the housing 2 is in the open state, and appears to be, an antenna having projected rectangular shaped degenerate separation elements when the housing 2 is in the shut state.

Therefore, it is possible to prevent cross polarization regardless of the open/shut state of the housing 2, and to adapt the circularly polarized wave patch antenna 4 to a polarized radio wave from a satellite. In other words, the polarization of the patch antenna 4 can be switched according to the open/shut state of the housing 2. This makes it possible to prevent the antenna characteristics from appearing to be deteriorated, and to measure the antenna characteristics in an optimum state. It is also possible to efficiently receive the radio wave W from a GPS satellite or the like even when the volume of the patch antenna 4 is small and the gain is low, and to reduce the size of the housing 2.

The above explanation is directed to a case that the patch antenna 4 is provided in the movable unit 22 in such a manner that its surface (on which the patch element 411 is formed) faces toward the inner surface 221 (the housing's rear direction), as shown in FIG. 3A. The present invention can also be applied to a reverse case. That is, the present invention can also be applied to a case that the patch antenna 4 is provided in the movable unit 22 in such a manner that its surface faces toward the outer surface 222 (the housing's front direction). More specifically, in the case that the surface faces to the housing's rear direction, the switching elements 43 are turned off when the housing 2 is in the open state, and turned on when the housing 2 is in the shut state. In the case that the surface faces to the housing's front direction, the reverse logic is applied. That is, the switching elements 43 are turned on when the housing 2 is in the open state, and turned off when the housing 2 is in the shut state. Further, the present invention can be applied to a case that the patch antenna 4 is provided in the fixed unit 21 in such a manner that the surface faces toward the inner surface or outer surface of the fixed unit 21. The above description applies to the example below in FIGS. 7 to 9C.

Figure 7:
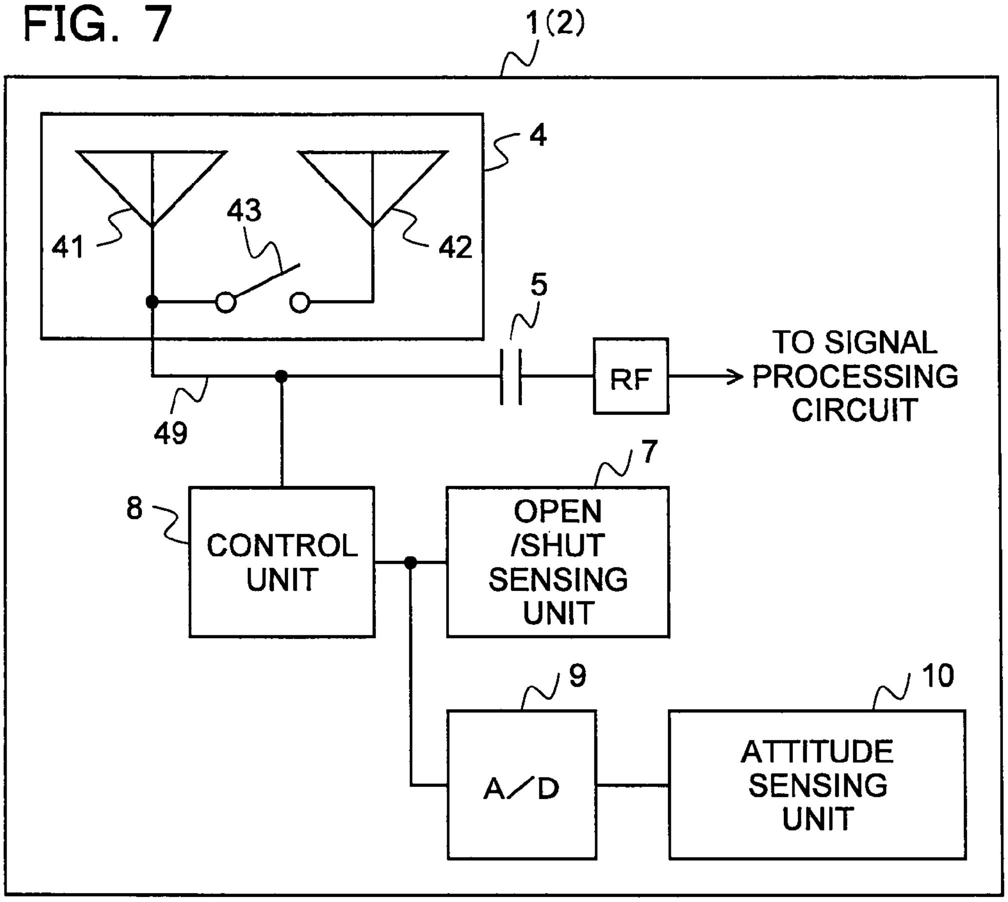
FIG. 7 is a block diagram showing another example of the patch antenna or wireless device of the present invention.
Figure 8:
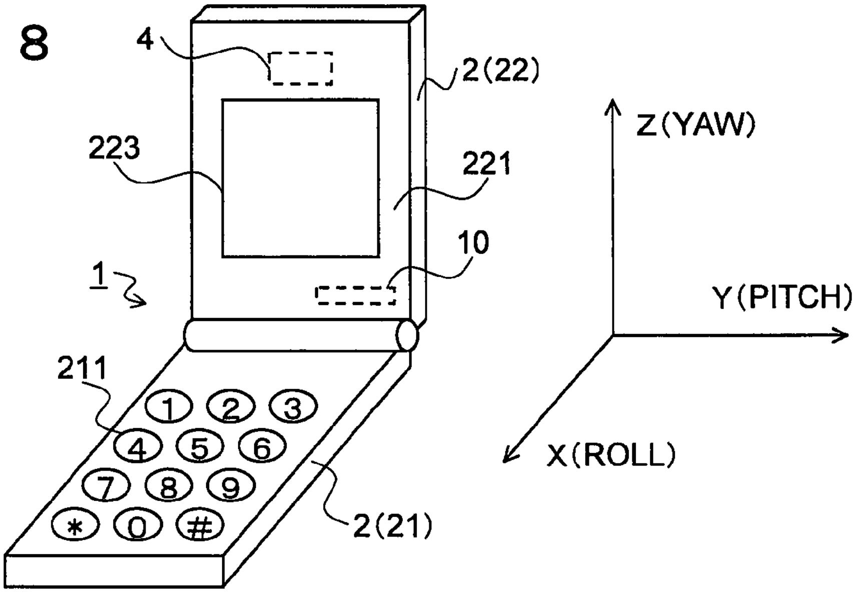
FIG. 8 is a view showing a cell phone which is an example of the wireless device in FIG. 7.

FIGS. 7 to 9C show a second embodiment of the present invention. FIG. 7 is a block diagram showing another example of the wireless device 1 having the patch antenna 4 of the present invention. FIG. 8 is a view showing a cell phone which is an example of a wireless device 1 in FIG. 7. FIGS. 9A to 9C are tables for explaining the cell phone which is the example of the wireless device 1 in FIG. 7. This example shows a device obtained by adding an attitude sensing unit 10 (and an A/D 9) and a control unit 8 to the example shown in FIGS. 1 to 6B. In other words, this example shows a device in which a state of a patch antenna 4 is adjusted to correspond not only to the open/shut state of the cell phone 1 but also to the state (tilt) of the cell phone 1 at the time.

The attitude sensing unit 10 comprises a well-known three-dimensional tilt sensor or acceleration sensor. The attitude sensing unit 10 senses (or detects) the tilt of a housing 2, forms an attitude signal (analog signal) indicating the tilt, and inputs the attitude signal to the analog-to-digital converter circuit (A/D) 9. The attitude signal is converted into a digital signal by the A/D 9, and input to the control unit 8. An open/shut signal described above from an open/shut sensing unit 7 is input to the control unit 8. The control unit 8 forms a control signal for a switching unit 43 based on the open/shut signal and attitude signal. The switching unit 43 switches disconnection of a second element 42 from a first element 41 and connection of the second element 42 to the first element 41 based on the control signal.

The attitude sensing unit 10 is provided in such a manner that its tilt to the first and second polarized waves is equal to that of the patch antenna 4, as shown in FIG. 8. For example, in a movable unit 22, the attitude sensing unit 10 is provided on a print circuit board (not shown) on which the patch antenna 4 is provided.

As shown in FIG. 8, the attitude sensing unit 10 senses tilts of the patch antenna 4 (or the second housing 22 in which the patch antenna 4 is provided) in the directions of three axes, the X-axis (roll), Y-axis (pitch), and Z-axis (yaw) orthogonal to one another, and forms three attitude signals indicating the tilts for the X-axis, Y-axis and Z-axis. In the case shown in FIG. 8, the X-axis is not relevant to reception of the first and second polarized waves, and the Y-axis and Z-axis dominate reception of polarized waves. This relationship is appropriately changed according to how the X-axis and the others are assigned to the roll, pitch and yaw.

Then, the control unit 8 forms an intermediate signal which is used as the basis for a control signal according to combinations of a Y-axis attitude signal and a Z-axis attitude signal. For this purpose, the control unit 8 has a table 81, as shown in FIG. 9A. The table 81 stores information to define in advance that the patch antenna 4 is to be made suitable for any one of the first and second polarized waves, according to combinations of the Y-axis attitude signal and Z-axis attitude signal. The control unit 8 may have a table 82 (to be described later).

In the case shown in FIG. 8, a circularly polarized wave reception state changes twice during 360 degree rotation about the Y-axis. Accordingly, the Y-axis attitude signal is divided (or classified) into two groups, each of which covers 180 degree according to tilt angle. Further, in the case shown in FIG. 8, the circularly polarized wave reception state changes four times during 360 degree rotation about the Z-axis. Accordingly, the Z-axis attitude signal is divided into four groups, each of which covers 90 degree according to tilt angle. This division is appropriately changed according to how the Y-axis and the others are assigned to the roll, pitch and yaw. At this time, the first group of the Y-axis attitude signal covers not 1 to 180 degree but 0 to 179 degree. The same applies to the Z-axis attitude signal.

The control unit 8 refers to the table 81 according to a combination of the Y-axis attitude signal and Z-axis attitude signal, and forms an intermediate signal serving as the basis for the control signal based on the table 81. For example, when the Y-axis attitude signal falls within a range of 0 to 179 degree and the Z-axis attitude signal falls within a range of 0 to 89 degree, an intermediate signal is formed to be “F” according to the table 81. The value means that this case is the same as the case of the housing’s front direction described above. For example, when the Y-axis attitude signal falls within a range of 0 to 179 degree, and the Z-axis attitude signal falls within a range of 90 to 179 degree, an intermediate signal is formed to be “R” according to the table 81. The value means that this case is the same as the case of the housing’s rear direction described above.

The control unit 8 forms a control signal based on the intermediate signal and open/shut signal. For this purpose, the control unit 8 logically transforms the intermediate signal. FIG. 9B shows an example of the intermediate signals logically transformed. FIG. 9C shows an example of the open/shut signals.

When an intermediate signal is “F,” the control unit 8 converts the intermediate signal of “F” into a high level signal (H), as shown in FIG. 9B. This makes it possible to form a control signal, which turns on and off the switching elements 43 when the housing 2 is in an open state and in a shut state, respectively. Accordingly, it is possible to control the patch antenna 4, as in the case of the housing’s front direction described above.

On the other hand, when an intermediate signal is “R,” the control unit 8 converts the intermediate signal of “R” into a low level signal (L), as shown in FIG. 9B. This makes it possible to form a control signal, which turns off and on the switching elements 43 when the housing 2 is in the open state and in the shut state, respectively. Accordingly, it is possible to control the patch antenna 4, as in the case of the housing’s rear direction described above. As a result, the circularly polarized wave reception state of the patch antenna 4 can be more precisely controlled according to the attitude of the cell phone 1.

As has been explained above, according to the present invention, a patch antenna can be brought into a state suitable for a first polarized wave or a state suitable for a second polarized wave, as needed. This makes it possible to, in a wireless device such as a cell phone, reliably receive weak radio waves with a small loss by controlling a patch antenna to be optimized for reception of circularly polarized waves according to the open/shut state of a housing. Also, this makes it possible to obtain a patch antenna which can be mounted in a small wireless device such as a cell phone. Accordingly, it is possible to, without increasing the size, provide a function of receiving a radio wave from a GPS satellite on a wireless device, and expand the applicability of the GPS.

What is claimed is:

1. A wireless device comprising:

a patch antenna;

a first housing and a second housing, both of which are provided to be openable and closable, and the patch antenna being provided in the first or second housing; and an open/shut sensing unit which senses an open/shut state of the first housing with respect to the second housing and forms an open/shut signal indicating the open/shut state, wherein the patch antenna comprises:

a first element which corresponds to a first polarized wave;

a second element which corresponds to a second polarized wave and is to be added to the first element; and a switching unit which disconnects the second element from the first element or connects the second element to the first element to make the patch antenna suitable for the first or second polarized wave, wherein the switching unit switches the disconnection of the second element from the first element and the connection of the second element to the first element based on the open/shut signal;

wherein the switching unit comprises switching elements which connect the first element and the second element;

wherein each of the switching elements comprises a diode having a cathode connected to the first element and an anode connected to the second element, and wherein the second element is connected to a ground potential through a choke coil, wherein when the wireless device is in an open state, the diodes are turned off according to the open/shut signal to disconnect the second element from the first element, thereby the patch antenna becomes in a state suitable for the first polarized wave, and, when the wireless device is in a shut state, the diodes are turned on according to the open/shut signal to connect the second element to the first element, thereby the patch antenna becomes in a state suitable for the second polarized wave, said wireless device further comprising:

an attitude sensing unit which senses a tilt of the housing and forms an attitude signal indicating the tilt; and a control unit which forms a control signal for the switching unit based on the open/shut signal and the attitude signal, wherein the switching unit switches the disconnection of the second element from the first element and the connection of the second element to the first element based on the control signal.

2. The wireless device according to claim 1, wherein the attitude sensing unit is provided in such a manner that a tilt of the attitude sensing unit to the first and second polarized waves is equal to a tilt of the patch antenna.

3. The wireless device according to claim 2,wherein the attitude sensing unit senses tilts of the patch antenna in directions of three axes of an X-axis, a Y-axis and a Z-axis orthogonal to one another and forms attitude signals indicating the tilts for the X-axis, Y-axis and Z-axis, and wherein, when the X-axis is not relevant to reception of the first and second polarized waves, the control unit forms an intermediate signal serving as a basis for the control signal according to a combination of the attitude signal for the Y-axis and the attitude signal for the Z-axis and forms the control signal based on the intermediate signal and the open/shut signal.

4. The wireless device according to claim 3, wherein the attitude sensing unit has a table which stores information to define in advance that the patch antenna is to be made suitable for any one of the first and second polarized waves according to the combination of the Y-axis attitude signal and Z-axis attitude signal, and forms the intermediate signal serving as the basis for the control signal based on the table.

5. The wireless device according to claim 4, wherein one of the attitude signal for the Y-axis and the attitude signal for the Z-axis is divided into two groups each of which covers 180 degree, and the other is divided into four groups each of which covers 90 degree.

6. The wireless device according to claim 1, wherein the wireless device comprises a cell phone.

7. The wireless device according to claim 1, wherein the patch antenna further comprises:

feeding unit for the patch antenna; and a feeder line which connects the feeding unit and the first element, and wherein the open/shut sensing unit applies the open/shut signal composed of DC component to the diodes through the feeder line.

* * * * *